Patented Apr. 26, 1949

2,468,159

UNITED STATES PATENT OFFICE 2,468,159

VULCANIZATION OF RUBBER

Bernard C. Barton, Clifton, N. J., assignor to United States Rubber Company, New York, N. Y., a corporation of New Jersey No Drawing. Application August 31, 1945, Serial No. 613,948

4 Claims. (Cl. 260—795)

This invention relates to improvements in low temperature vulcanization of rubber and rubber-like substances.

This invention is concerned with an improvement in the invention described and claimed in Cadwell U. S. Patent No. 1,463,794 wherein rubber or similar material is combined with a vulcanizing agent, a metal M in combination, carbon disulfide, and an amine having a replaceable ammoniacal hydrogen atom, the carbon disulfide and the amine being combined with the rubber as separate materials with respect to one another, and vulcanizing the rubber. The mixed and formed rubber stock may be exteriorly exposed to the carbon disulfide in various manners as there described, and the amine may be any primary or secondary amine capable of combining with the $CS_2$ to form a low temperature vulcanization accelerator. Vulcanization is carried out at room or slightly elevated temperatures.

The present improvement invention is concerned with modifying the above procedure to accommodate the incorporation of vulcanization retarding fillers and extenders in natural rubber and in those synthetic rubbers in which, as in natural rubber, vulcanization is rapid in the absence of such fillers and markedly retarded in the presence of such fillers. Synthetic rubbers which exhibit this behavior are the 1,3-diolefine hydrocarbon polymers, exemplified by the polymers of 1,3-butadiene and isoprene, and the copolymers of such 1,3-diolefine hydrocarbons with styrene, and ring-substituted styrenes, such as p-methyl styrene, p-chlorostyrene, and the ring-dichlorostyrenes.

The invention is especially applicable to certain rubber stocks in which the sulfur content is reduced to from 0.5 to less than 2 parts, by weight (based on 100 parts of the rubber). Many instances arise where it is desired to incorporate fillers, i. e., materials which provide bulk, softening, reinforcement, and sometimes additionally color. The retarding type fillers are exemplified by carbon black, silica made by vapor phase oxidation of silicon, and rosin type softeners, including rosin, hydrogenated rosin, dehydrogenated rosin, polymerized rosin, etc. They have a tendency to materially retard the vulcanization of some rubbers, especially when the mix contains a $CS_2$-reactive aliphatic primary or secondary amine having a dissociation constant in the range from about $10^{-4}$ to about $10^{-10}$, and the mix is exteriorly exposed to $CS_2$ and cured. I have discovered that, if in addition to such an amine there is additionally incorporated in the stock a strong organic base which itself is incapable of reacting with the $CS_2$, the carbon disulfide diffusion vulcanization may be greatly accelerated.

More particularly, the present invention relates to the vulcanization of rubber compositions containing a vulcanization-retarding filler, by means of a combination of vulcanization ingredients comprising sulfur, a functionally aliphatic primary or secondary amine having a dissociation constant in the range from about $10^{-4}$ to about $10^{-10}$, a metallic oxide, and an organic base incapable of reacting with $CS_2$ under vulcanizing conditions and having a dissociation constant greater than about $10^{-5}$, and exposing the completely mixed and formed rubber stock to $CS_2$. It can be stated that the compounded rubber stock, in the absence of the $CS_2$, is as stable towards scorch and precuring as with the stocks described in the Cadwell patent.

The preferred functionally aliphatic amines are the alkyl and aralkyl secondary amines, particularly desirable ones being diamylamine, dihexylamine, dibenzylamine, dioctylamine, didecylamine, didodecylamine, and dioctadecylamine, as well as benzylamylamine, benzyl octaylamine, and other mixed secondary amines, which have sufficiently low vapor pressures so that they are not lost by evaporation from the rubber before and during vulcanization. N-methyl aniline, an amine of mixed character, also works. Suitable primary alkylamines are such as heptylamine, octylamine, decylamine, dodecylamine, octadecylamine, and benzylamine. Since benzyl has functionally aliphatic properties, for the purpose of this invention, it is classed with the alkylamines.

Among the strong organic bases which are unreactive with $CS_2$ are the trialkylamines and the quaternary ammonium hydroxides, exemplified by tripropylamine, tributylamine, triamylamine, triisoamylamine, trihexylamine, dimethyl benzylamine, diethyl benzylamine, dipropyl benzylamine, methyl ethyl benzylamine, tetra-ethanol ammonium hydroxide, tetramethyl ammonium hydroxide, tetraethyl ammonium hydroxide, tetrapropyl ammonium hydroxide, tetrapropanol ammonium hydroxide, tetrabutyl ammonium hydroxide, tetraamyl ammonium hydroxide, dimethyl-diethyl ammonium hydroxide, trimethyl benzyl ammonium hydroxide, dimethyldibenzyl ammonium hydroxide, triethylbenzyl ammonium hydroxide, triamylbenzyl ammonium hydroxide, tripropylbenzyl ammonium hydroxide, dipropyldibenzyl ammonium hydroxide and benzyltriethanol ammonium hydroxide; such bases of higher molecular weight are less volatile from the mix, after incorporation along with the other vulcanization ingredients on a mill or internal mixer, although amines of less molecular weight are also effective. The order of incorporation is not important in preparing the stock for diffusion thereinto of CS₂ and cure.

The following examples are given to illustrate the invention, the parts being by weight:

*Example I*

|  | A | B | C |
|---|---|---|---|
| GR-S (rubbery copolymer of butadiene and styrene) | 100 | 100 | 100 |
| Soft carbon black (P33) | 100 | 100 | 100 |
| Zinc oxide | 10 | 10 | 10 |
| Rosin | 15 | 15 | 15 |
| Dibenzylamine | 4.5 | 4.5 | 4.5 |
| Sulfur | 1.0 | 1.0 | 1.0 |
| Tributylamine |  | 0.65 |  |
| Tetraethanol ammonium hydroxide (40% solution, aqueous) |  |  | 2.0 |

The above compounds were mixed on a 6″ x 12″ mill and sheeted to a thickness of 0.10 inch. These stocks were exposed for 24 hours in a closed chamber to 2% of their weight of CS₂ vapor. The treated stocks were then aired 16 hours to remove excess CS₂, and the cure was completed by heating in an air oven at 135° F.

| Durometer Hardness (15 seconds) | A | B | C |
|---|---|---|---|
| 10 hours at 135° F | 25 | 50 | 48 |
| 1 day at 135° F | 27 | 53 | 56 |
| 2 days at 135° F | 34 | 56 | 59 |
| 4 days at 135° F | 43 | 58 | 60 |

Comparison of Examples I—B and I—C with the control I—A shows that a much tighter and more rapid cure is achieved by use of my invention. Triamylamine may be used in place of tributylamine, with similar results.

*Example II*

Stocks were prepared as follows:

|  | A | B | C | D | E | F | G | H | I | J |
|---|---|---|---|---|---|---|---|---|---|---|
| GR-S elastomer | 100 | 100 | 100 | 100 | 100 | 100 | 100 | 100 | 100 | 100 |
| Carbon black (reinforcing furnace type) | 50 | 50 | 50 | 50 | 50 | 50 | 50 | 50 | 50 | 50 |
| Light mineral oil | 5 | 5 | 5 | 5 | 5 | 5 | 5 | 5 | 5 | 5 |
| Zinc oxide | 10 | 10 | 10 | 10 | 10 | 10 | 10 | 10 | 10 | 10 |
| Sulfur | 1.0 | 1.0 | 1.0 | 1.0 | 1.0 | 1.0 | 1.0 | 1.0 | 1.0 | 1.0 |
| Dibenzylamine | 4.0 | 4.0 |  |  |  |  |  |  |  |  |
| Dioctylamine |  |  | 4.8 | 4.8 |  |  |  |  |  |  |
| Didodecylamine |  |  |  |  | 7.0 | 7.0 |  |  |  |  |
| N-methylaniline |  |  |  |  |  |  | 2.15 | 2.15 |  |  |
| Octylamine |  |  |  |  |  |  |  |  | 2.58 | 2.58 |
| Tetraethanol ammonium hydroxide (40% aqueous solution) |  | 2.5 |  | 2.5 |  | 2.5 |  | 2.5 |  | 2.5 |

The stocks were mixed and activated with CS₂ as described in Example I. Cure was completed by heating in an air oven at 120° F.

| Durometer Hardness (15 Seconds) | A | B | C | D | E | F | G | H | I | J |
|---|---|---|---|---|---|---|---|---|---|---|
| 6 hrs. at 120° F | (¹) | 50 | (¹) | 43 | (¹) | 40 | (¹) | 30 | 30 | 49 |
| 1 day at 120° F | 30 | 56 | 40 | 55 | (¹) | 48 | (¹) | (¹) | 38 | 50 |
| 2 days at 120° F | 34 | 59 | 43 | 58 | (¹) | 50 | (¹) | 30 | 38 | 50 |
| 4 days at 120° F | 36 | 59 | 47 | 58 | (¹) | 52 | (¹) | 40 | 38 | 50 |

¹ No cure.

Comparison of the GR-S stocks containing tetraethanol ammonium hydroxide with those not containing it shows the great advantages of the present invention. Acceleration of vulcanization by tetraethanol ammonium hydroxide is accomplished in the presence of either primary or secondary amines.

*Example III*

The following stocks were mixed, activated and cured as described in Example I, the contents of sulfur, primary or secondary amine, and quaternary ammonium base differing from those in Examples I and II:

|  | A | B | C | D | E | F |
|---|---|---|---|---|---|---|
| Smoked sheet | 100 | 100 | 100 | 100 | 100 | 100 |
| HMF Carbon black | 50 | 50 | 50 | 50 | 50 | 50 |
| Light Mineral oil | 5 | 5 | 5 | 5 | 5 | 5 |
| Zinc oxide | 10 | 10 | 10 | 10 | 10 | 10 |
| Sulfur | 1.5 | 1.5 | 1.5 | 1.5 | 1.5 | 1.5 |
| Dibenzylamine | 2.0 | 2.0 |  |  |  |  |
| Didodecylamine |  |  | 3.5 | 3.5 |  |  |
| N-methylaniline |  |  |  |  | 1.08 | 1.08 |
| Tetraethanol ammonium hydroxide (40% aqueous solution) |  | 2.0 |  | 2.0 |  | 2.0 |

| Durometer Hardness (15 Seconds) | A | B | C | D | E | F |
|---|---|---|---|---|---|---|
| 2 hrs. at 120° F | 27 | 40 | (¹) | 27 | (¹) | (¹) |
| 1 day at 120° F | 36 | 45 | 43 | 47 | (¹) | 48 |
| 2 days at 120° F | 39 | 55 | 47 | 53 | (¹) | 52 |
| 4 days at 120° F | 45 | 58 | 50 | 54 | (¹) | 52 |

¹ No cure.

Example III shows again that a tighter and faster cure is achieved through the use of my invention. Indeed, the Hevea stock containing N-methylaniline does not cure at all in the absence of the quaternary base, but cures well in the presence of the quaternary base.

*Example IV*

|  | A | B | C | D | E | F |
|---|---|---|---|---|---|---|
| GR-S (Butadiene-styrene elastomer) | 100 | 100 | 100 | 100 | 100 | 100 |
| ZnO | 10 | 10 | 10 | 10 | 10 | 10 |
| Dibenzylamine | 2.0 | 2.0 | 2.0 | 2.0 | 2.0 | 2.0 |
| Sulfur | 1.5 | 1.5 | 1.5 | 1.5 | 1.5 | 1.5 |
| Turgum S (rosin type softener) |  |  | 15 | 15 |  |  |
| White Soot (silicon dioxide, oxidative process) |  |  |  |  | 50 | 50 |
| Tetraethanol ammonium hydroxide (40% aqueous solution) |  | 3.0 |  | 3.0 |  | 3.0 |

The above stocks were mixed and activated as described in Example I. Cure was completed by heating in air oven at 125° F.

| Durometer Hardness (15 Seconds) | A | B | C | D | E | F |
|---|---|---|---|---|---|---|
| 1 day at R. T. plus— | | | | | | |
| 3.5 hrs. at 125° F | [1] | 46 | [1] | 18 | [1] | 32 |
| 7.5 hrs at 125° F | 22 | 46 | [1] | 23 | [1] | 46 |
| 1 day at 125° F | 28 | 46 | [1] | 35 | [1] | 62 |
| 3 days at 125° F | 38 | 48 | [1] | 42 | [1] | 62 |

[1] No cure.

Comparison of the stocks containing tetraethanol ammonium hydroxide with those not containing it shows the great advantage which the invention presents.

In case the stock is to be cured at temperatures where $CS_2$ vapor presents an explosion hazard, it may be dealt with as described in the Cadwell patent, or excess $CS_2$ is removed before the heating is begun.

It is to be understood that whereas for the combination first above mentioned in reference to U. S. Patent No. 1,463,794, on which this invention is an improvement, the more commonly known acceleration activator having metal, i. e., zinc, in combination, e. g., zinc oxide, is given herein by way of example, other acceleration activators having metal or zinc, in combination, which give with dithiocarbamate accelerators, cures equivalent to those obtained with zinc oxide, are to be construed as equivalents thereof in the claims for the purposes of this invention.

Having thus described my invention, what I claim and desire to protect by Letters Patent is:

1. A method which comprises incorporating in a rubber composition, a vulcanization retarding filler, and vulcanizing ingredients including sulfur, zinc oxide, an amine selected from the class consisting of the mono-amines of the alkyl, aralkyl, and mixed alkyl aryl series which are reactive with carbon disulfide and having a dissociation constant in the range from about $10^{-4}$ to about $10^{-10}$, and additionally an organic nitrogen base unreactive with carbon disulfide and having a dissociation constant greater than about $10^{-5}$, and afterwards exteriorly exposing the mixed and formed rubber stock to carbon disulfide and curing the rubber.

2. A method which comprises incorporating in a rubber composition, carbon black, and vulcanizing ingredients including sulfur, zinc oxide, an amine selected from the class consisting of the mono-amines of the alkyl, aralkyl, and mixed alkyl aryl series which are reactive with carbon disulfide and having a dissociation constant in the range from about $10^{-4}$ to about $10^{-10}$, and additionally an organic nitrogen base unreactive with carbon disulfide and having a dissociation constant greater than about $10^{-5}$, and afterwards exteriorly exposing the mixed and formed rubber stock to carbon disulfide and curing the rubber.

3. A method which comprises incorporating in a rubber composition, a vulcanization retarding filler, and vulcanizing ingredients including sulfur, a zinc oxide acceleration activator, an amine selected from the class consisting of the mono-amines of the alkyl, aralkyl, and mixed alkyl aryl series which are reactive with carbon disulfide and having a dissociation constant in the range from about $10^{-4}$ to about $10^{-10}$, and additionally an organic nitrogen base unreactive with carbon disulfide and having a dissociation constant greater than about $10^{-5}$, and afterwards exteriorly exposing the mixed and formed rubber stock to carbon disulfide and curing the rubber.

4. A method which comprises incorporating in a rubber composition, a vulcanization retarding filler, and vulcanizing ingredients including sulfur, an acceleration activator containing zinc oxide, an amine selected from the class consisting of the mono-amines of the alkyl, aralkyl, and mixed alkyl aryl series which are reactive with carbon disulfide and which have a dissociation constant in the range from about $10^{-4}$ to about $10^{-10}$, and additionally an organic nitrogen base unreactive with carbon disulfide and having a dissociation constant greater than about $10^{-5}$, and afterwards exteriorly exposing the mixed and formed rubber stock to carbon disulfide and curing the rubber.

BERNARD C. BARTON.

No references cited.

Certificate of Correction

April 26, 1949.

Patent No. 2,468,159.

BERNARD C. BARTON

It is hereby certified that error appears in the printed specification of the above numbered patent requiring correction as follows:

Column 3, line 67, in the table, immediately under "H", for the numeral "30" read (¹);

and that the said Letters Patent should be read with this correction therein that the same may conform to the record of the case in the Patent Office.

Signed and sealed this 4th day of October, A. D. 1949.

[SEAL]

THOMAS F. MURPHY,
*Assistant Commissioner of Patents.*